United States Patent [19]
Finsterwalder et al.

[11] Patent Number: 5,468,834
[45] Date of Patent: Nov. 21, 1995

[54] SHEET REGISTRATION DEVICE

[75] Inventors: Robert N. Finsterwalder, Webster; Richard L. Carlston; Edward L. Schlueter, Jr., both of Rochester; Lucille M. Sharf, Pittsford, all of N.Y.

[73] Assignee: Xerox Croporation, Stamford, Conn.

[21] Appl. No.: 767,711

[22] Filed: Sep. 30, 1991

[51] Int. Cl.$^6$ .................. C08G 18/32; C08G 18/48; B65H 9/10
[52] U.S. Cl. .............. 528/76; 271/113; 271/184; 271/220; 271/236; 271/250; 528/60; 528/65
[58] Field of Search ................. 528/60, 65, 76, 528/77; 271/236, 113, 184, 250, 220

[56] References Cited

U.S. PATENT DOCUMENTS

| | | | |
|---|---|---|---|
| 2,929,800 | 3/1960 | Hill, Jr. | 528/59 |
| 3,033,825 | 5/1962 | Murphy | 528/60 |
| 3,718,624 | 2/1973 | Rustad | 528/60 |
| 3,746,665 | 7/1973 | Koleske et al. | 528/71 |
| 3,798,200 | 3/1974 | Kaneko et al. | 528/65 |
| 3,804,812 | 4/1974 | Koroscil | 528/65 |
| 4,086,211 | 4/1978 | Nakauchi et al. | 528/76 |
| 4,131,604 | 12/1978 | Szycher | 528/76 |
| 4,355,119 | 10/1982 | Pechhold | 528/76 |
| 4,371,687 | 2/1983 | Robinson | 528/76 |
| 4,447,590 | 5/1984 | Szycher | 528/76 |
| 4,451,622 | 5/1984 | Di Domenico, Jr. | 525/456 |
| 4,519,698 | 5/1985 | Kohyama et al. | 355/15 |
| 4,523,005 | 6/1985 | Szycher | 528/76 |
| 4,541,626 | 9/1985 | Millen | 271/236 |
| 4,543,405 | 9/1985 | Ambrose et al. | 528/78 |
| 4,739,027 | 4/1988 | Mendelsohn et al. | 528/76 |
| 4,786,703 | 11/1988 | Starner et al. | 528/64 |
| 4,823,161 | 4/1989 | Yamada et al. | 355/15 |
| 4,826,383 | 5/1989 | Millen | 414/789 |
| 4,870,150 | 9/1989 | Bandlish et al. | 528/76 |
| 4,929,667 | 5/1990 | Ban et al. | 252/182.22 |
| 4,958,197 | 9/1990 | Kinashi et al. | 355/299 |

*Primary Examiner*—James J. Seidleck
*Assistant Examiner*—Rabon Sergent
*Attorney, Agent, or Firm*—Samuel E. Mott

[57] ABSTRACT

A sheet registration device including a hub having an axis of rotation and a plurality of resilient plastic blades arranged in radial planes passing through said axis and extending in the direction of said axis beyond one end of the hub towards sheet-engaging tips lying in a common plane normal to said axis said blade being made of a polyurethane elastomer obtained by the reaction of a polytetramethylene ether glycol having the formula $HO[(CH_2)_4O]_nH$ where n is from 8 to 41, preferably 39 to 41, and from about 20 to about 95 parts preferably 22 to 26 parts by weight per 100 parts by weight of said glycol of a diisocyanate selected from the group consisting of diphenylmethane diisocyanates, toluene diisocyanates, naphthalene diisocyanates and blends thereof and a sufficient amount of cross linking agents to provide a crosslinked elastomer, said cross linking agents comprising a mixture of from about 75% to 60% by weight of a diol having the formula: $HO(R_1)OH$ where $R_1$ is a straight or branched chain alkyl group having from 2 to 12 carbon atoms and from about 25% to 40% by weight of a triol having the formula: $R'-C-[(OH)_a(CH_2OH)_b]$ where R' is $H, CH_3$ or $C_2H_5$, a is 0 or 1, b is 2 or 3 and a+b=3.

20 Claims, 10 Drawing Sheets

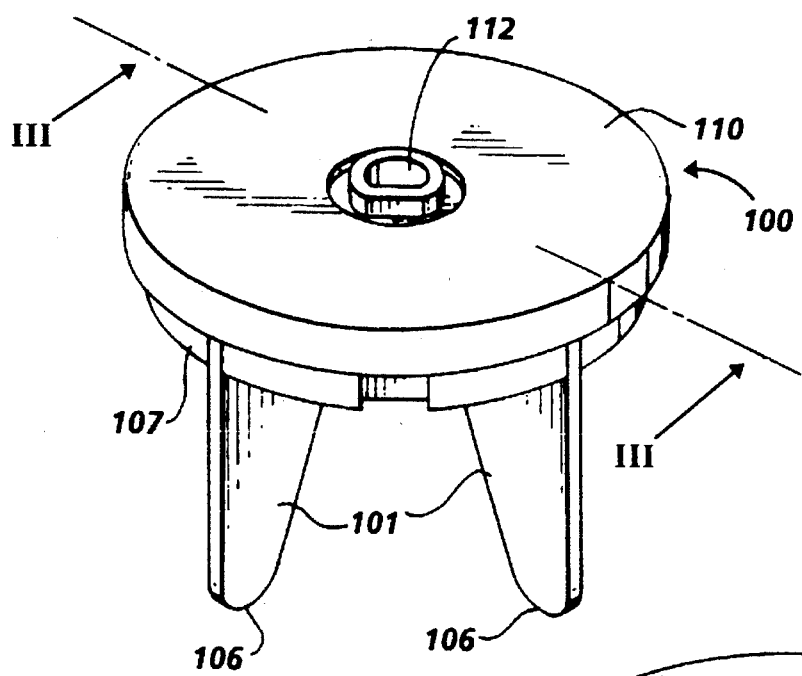
FIG. 6
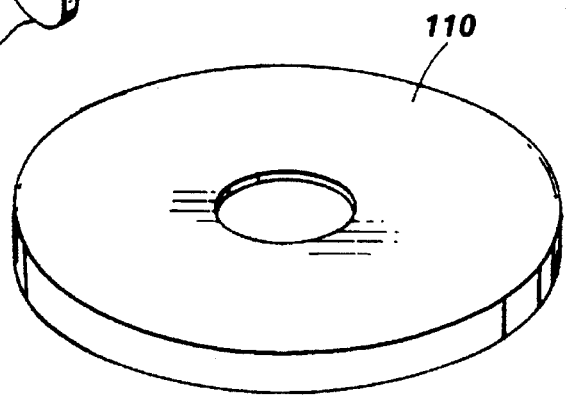
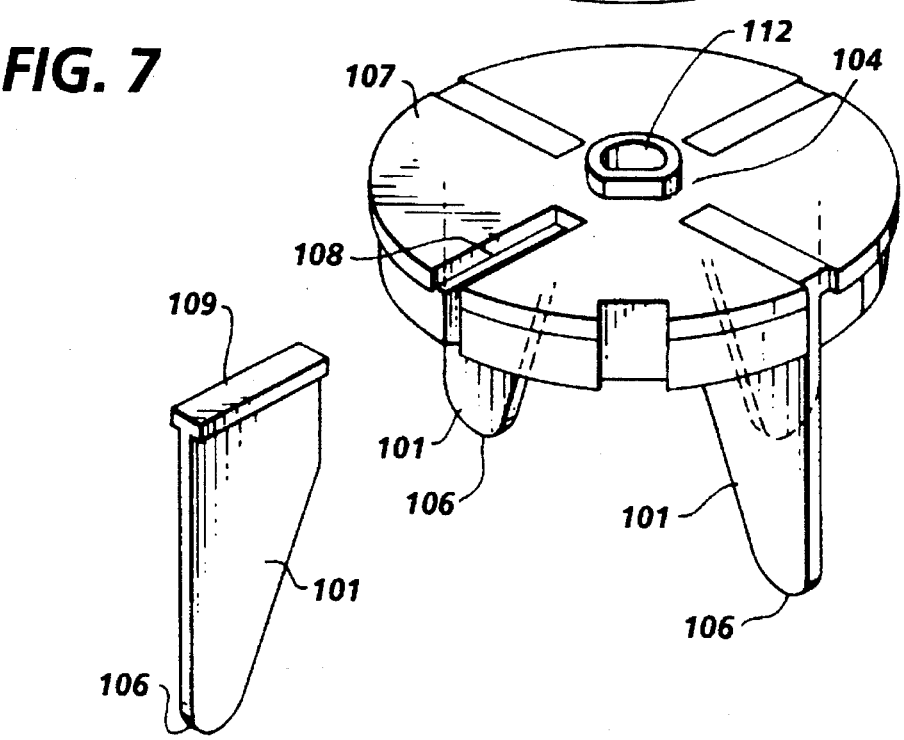
FIG. 7

SHEET REGISTRATION DEVICE

CROSS REFERENCE TO RELATED APPLICATIONS

Attention is directed to the following U.S. patent applications filed concurrently herewith. U.S. patent application Ser. No. 07/767,442, entitled High Wear Resistance Low Compression Set Polyurethane, in the name of Edward L. Schlueter, Jr., U.S. application Ser. No. 07/767,432, now U.S. Pat. No. 5,157,098, entitled Cleaning Apparatus, in the name Nero R. Lindblad et al., U.S. application Ser. No. 07/767,431, now U.S. Pat. No. 5,142,016, entitled Sheet Handling Scuffer Paddle Wheel, in the name of Lucille M. Sharf et al., and U.S. application Ser. No. 07/767,441, now U.S. Pat. No. 5,194,588, entitled Disk Stacker With Novel Paddle Wheel Wiper, in the name of Richard L. Carlston et al.

BACKGROUND OF THE INVENTION

The present invention is directed to a novel sheet registration device for a sheet registration apparatus and has particular application in an electrostatographic printing apparatus.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a developer material is transported into contact with the electrostatic latent image. Toner particles are attracted from the carrier granules of the developer material onto the latent image. The resultant toner powder image is then transferred from the photoconductive surface to a sheet of support material and permanently affixed thereto.

This process is well known and useful for light lens copying from an original and printing application from electronically generated or stored originals, and in ionography.

In U.S. Pat. No. 4,541,626 to Millen a sheet registration apparatus and device are described wherein a hub having an axis of rotation and a plurality of resilient blades arranged in radial planes passing through the axis and extending in the direction of the axis beyond one end of the hub towards sheet-engaging tips lying in a common plane normal to the axis is used to wipe over a limited arc of rotation against a sheet on a surface to urge it towards a registration stop. This device turns and positions a sheet into a corner registration so it can be finished by stapling and binding and is used in the Xerox 1075, 1090 and 5100 duplicators. The resilient blades are made of a conventional polyester polyurethane filled with carbon black. While capable of performing adequately they suffer certain deficiencies, particularly with respect to the variation in their mechanical properties with changes in temperature and relative humidity. The mechanical properties such as resiliency, wear, compression set and tensile set are dynamic properties varying with changes in temperature and relative humidity, thereby, providing unstable sheet registration performance paper edge alignment difficulties and misstapling.

In addition, the blades have a tendency, particularly in the warmer and more humid environments, to make black marks on the sheets being registered.

Accordingly, there is a need for an improved material having a more stable response in mechanical properties, particularly resiliency, to variations in temperature and relative humidity and in particular, having better wear and compression set characteristics as well as not making black marks on paper.

SUMMARY OF THE INVENTION n accordance with a principle aspect of the present invention a sheet registration apparatus and device, and in particular, a wiper device having a plurality of resilient blades more stable in mechanical properties in response to variations in temperature and relative humidity is provided.

In a further specific aspect of the present invention a wiper device having a plurality of resilient blades which does not leave black marks on paper sheets is provided.

In a further aspect of the present invention the blades of the wiper device are made of a polyurethane elastomer obtained by the reaction of a polytetramethylene ether glycol having the formula $HO[(CH_2)_4O]_nH$ wherein n is from 8 to 41, and from about 20 to about 95 parts by weight per 100 parts by weight of the glycol of a diisocyanate selected from the group of diphenylmethane diisocyanates, toluene diisocyanates, naphthalene diisocyanates and blends thereof and a sufficient amount of crosslinking agents to provide a cross linked elastomer, the crosslinking agents comprising a mixture of from about 75% to 60% weight of a diol having the formula $HO(R_1)OH$ where $R_1$ is a straight or branched chain alkyl group having 2 to 12 carbon atoms and from about 25% to 40% weight of a triol having the formula: $R'-C-[(OH)_a(CH_2OH)_b)]$ where $R'$ is H, $CH_3$, or $C_2H_5$ a is 0 or 1, b is 2 or 3 and a+b=3.

In a further aspect of the present invention the elastomer is prepared by first forming a prepolymer of the polytetramethylene ether glycol and the diisocyanate followed by the addition of both crosslinking agents to the prepolymer.

In a further aspect of the present invention the elastomer is prepared by adding all of the recited reactive constituents including the crosslinking agents to a reaction vessel at the same time.

In a further aspect of the present invention the mixture of crosslinkers is present in an amount of from about 4 to 18 parts by weight per 100 parts by weight of the glycol and preferably from about 4 to 6 parts by weight for the higher molecular weight glycols.

In a further aspect of the present invention the crosslinker is a mixture of about 75% weight of 1,4 butanediol and 25% eight trimethylolpropane.

In a further aspect of the present invention the crosslinker is a mixture of about 60% weight, 1,4 butanediol and 40% weight trimethylolpropane.

In a further aspect of the present invention is from 39 to 41 parts by weight and the diisocyanate is present in an amount of from about 22 to 26 parts by weight per 100 parts by weight of the glycol.

In a further aspect of the present invention the diisocyanate Is selected from the group of diphenyl methane diisocyanates and in a preferred embodiment is a blend of 4,4' diphenylmethane diisocyanate and 2,4' diphenylmethane diisocyanate.

For a better understanding as well as other objects and further features thereof, reference is made to the following drawings and descriptions.

BRIEF DESCRIPTION OF THE DRAWINGS

FIG. 6 is a perspective view of the registration device of the apparatus, FIG. 7 is an exploded perspective view of the device showing its construction, FIG. 8 is a section along the line III—III of FIG. 6, FIG. 9 is a section along the IV—IV of FIG. 8, and FIGS. 10A–10C are schematic illustrations of typical blade footprints for different stack heights.

DESCRIPTION OF PREFERRED EMBODIMENT

Figure 1:
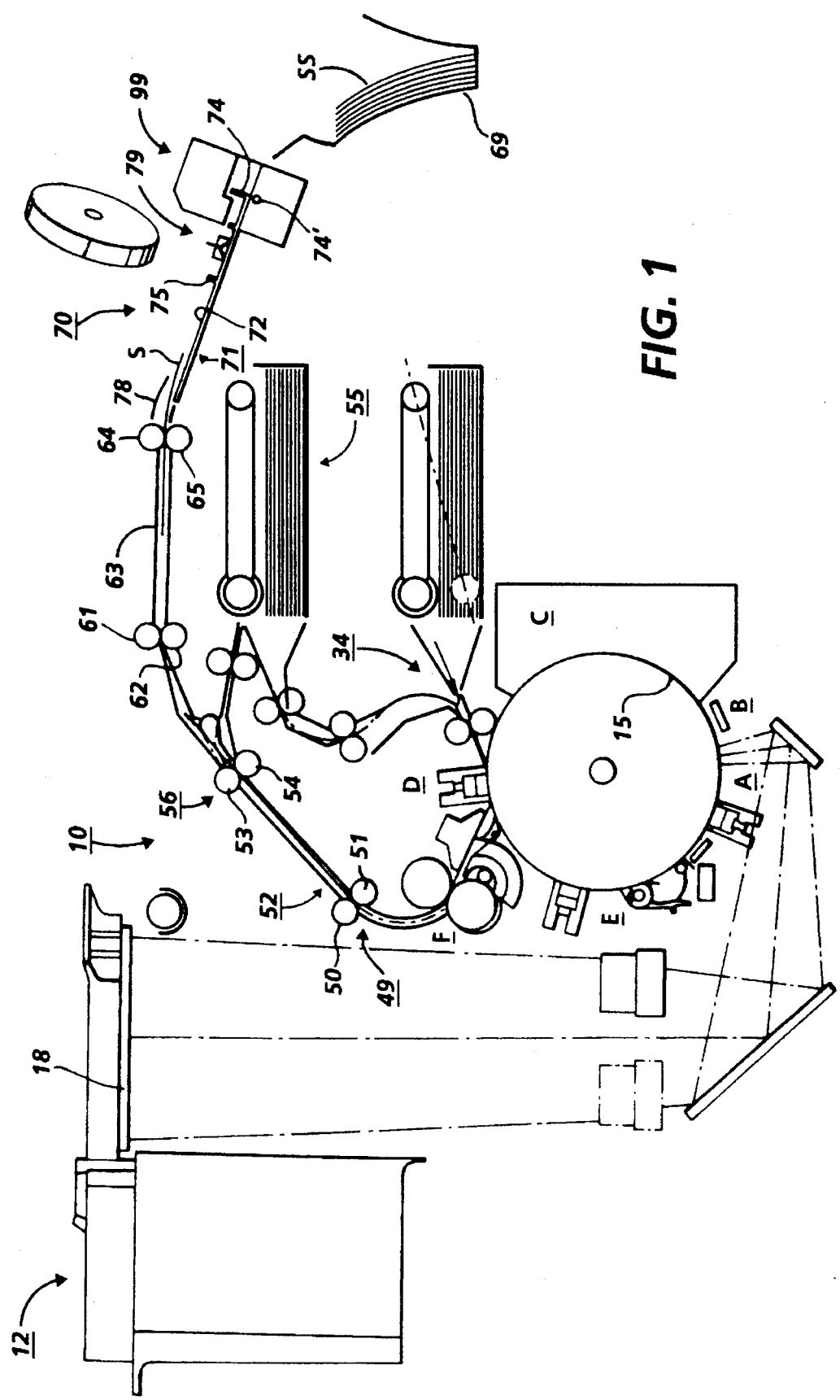
FIG. 1 is a schematic side elevation of a photocopier including a finisher incorporating the sheet registration apparatus according to the invention.

Referring to FIG. 1 there is shown an automatic xerographic reproducing machine 10 having a finisher 70 incorporating the sheet registration apparatus according to this invention for aligning sheets as they are stacked in the finisher prior to being acted upon by a stitcher 99. The copying machine 10 is capable of producing either simplex or duplex copies in sets from a wide variety of originals which may be advanced in recirculating fashion by a recirculating document apparatus 12 described in U.S. Pat. No. 3,556,512. Although the present invention is particularly well suited for use in automatic xerography the apparatus generally designated 70 is equally well suited for use with any number of devices in which cut sheets of material are delivered or compiled in a set or stack.

The processor 10 includes a photosensitive drum 15 which is rotated in the direction indicated so as to pass sequentially through a series of xerographic processing stations: a charging station A, an imaging station B, a developer station C, a transfer station D and a cleaning station E.

A document to be reproduced is transported by document handling apparatus 12 from the bottom of a stack to a platen 18 and scanned by means of a moving optical scanning system to produce a flowing light image on the drum at B. Cut sheets of paper are moved into the transfer station from sheet registering apparatus 34 in synchronous relation with the image the drum surface. The copy sheet is stripped from the drum surface and directed to a fusing station F. Upon leaving the fuser the fixed copy sheet is passed through a curvilinear sheet guide system generally referred to as 49, incorporating advancing rollers 50 and 51. The advancing rollers forward the sheet through a linear sheet guide system 52 and to a second pair of advancing rolls 53 and 54. At this point, depending on whether simplex or duplex copies are desired, the simplex copy sheet is either forwarded directly to the finisher 70 via pinch rolls 61, 62 or, for recirculation for making duplex copies, into upper supply tray 55, by means of a movable sheet guide 56. Movable sheet guide 56 and associated advancing rolls are pre-positioned by appropriate machine logic to direct the individual sheets into the desired path.

Figure 2:
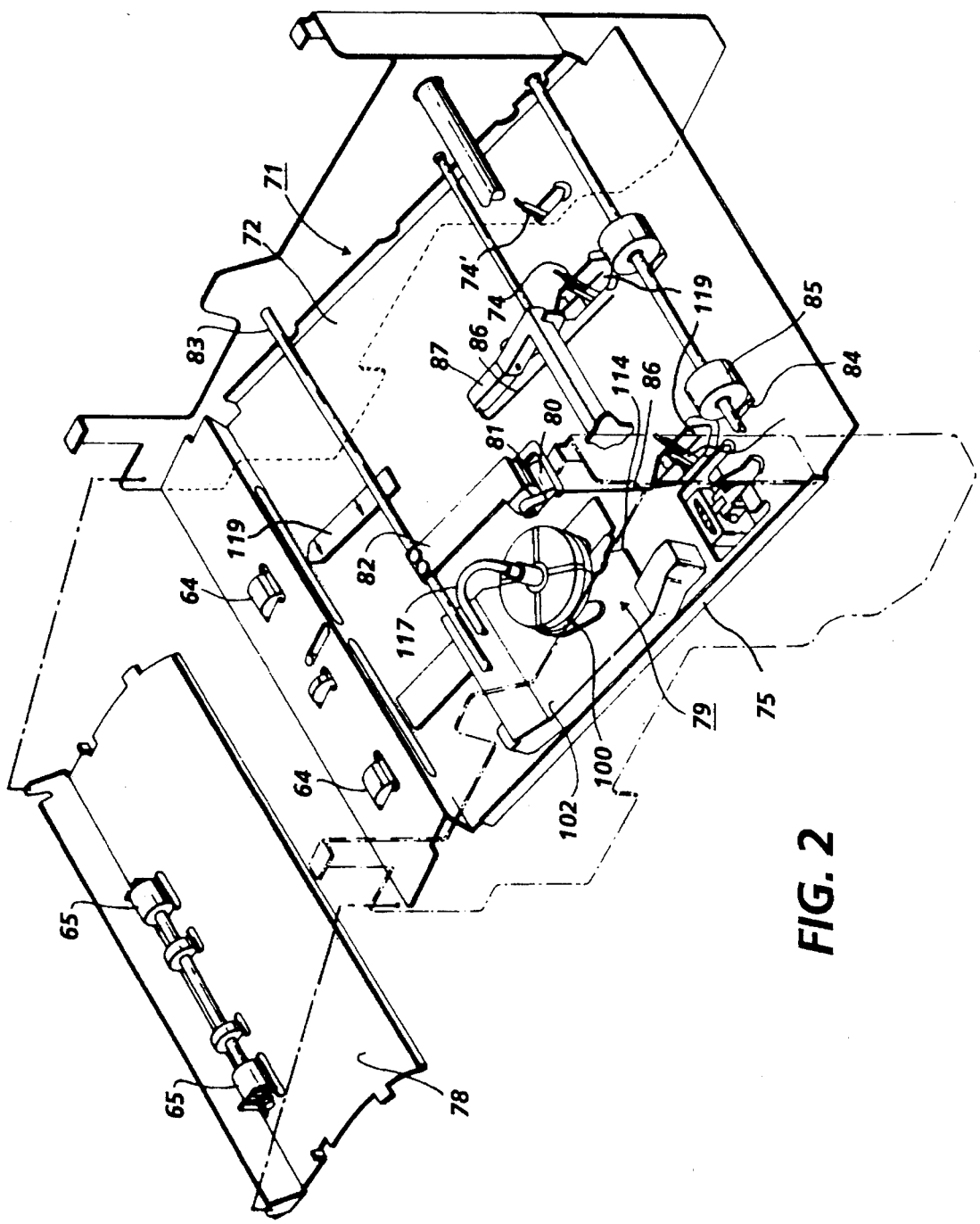
FIG. 2 is a perspective view of the finisher of FIG. 1, partly exploded and with parts removed for clarity, on an enlarged scale.
Figure 3:
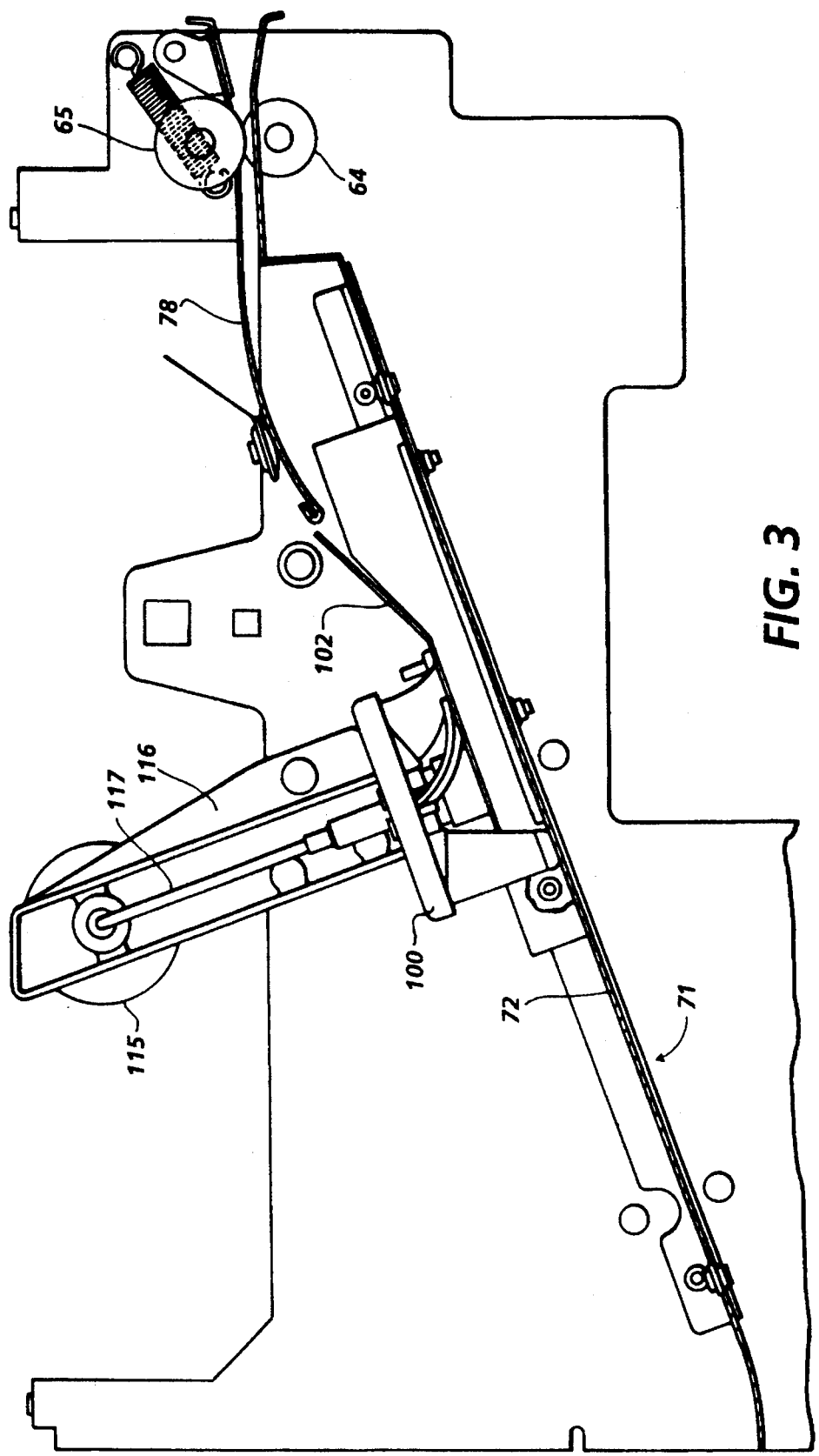
FIG. 3 is a section through the finisher along the direction of sheet travel looking towards the registration apparatus of this invention, showing the drive to the latter.

The finisher 70 includes a tray 71 having a base or support surface 72 inclined downwardly in the direction of sheet travel towards a registration corner 73 defined by registration members 74, 75 along the lower edge and one side of the tray. Along the upper end of the support surface is arranged a pair of co-acting sheet feed rolls 64, 65 arranged to receive sheets fed along passage 63 by pinch rolls 61, 62. From the feed rolls 64, 65 a sheet is directed by top guide 78 into the tray 71. A corner registration apparatus 79 in accordance with the present invention is arranged over the surface 72 to urge the sheets into the registration corner to position them for receiving a stitch from the apparatus 99. The registration fence 74 comprises two fingers 74 spaced to locate A4 and similar size paper with a third finger 74' to assist in locating wider sheets. The fingers 74, 74', are rotatable about an axis 74a so that they may be retracted for rejection of bound sets SS into a collection tray 69 or other suitable collection device such as a stacker which may have an elevating mechanism to increase its capacity and may be operable to offset sets or stacks delivered thereto drive rollers may be employed. Any suitable ejection system such as is shown in FIG. 2, a continuously rotating roller 80 projects through the base 72 of the tray and when a stack or set is to be ejected an idler roller 81 on a sprung arm 82 mounted on a rail 83 over the tray is pressed down against the top of the stack by a cam (not shown) simultaneously with retraction of the registration fingers 74 and 74'. Such an eject system in which the roller 80 is a soft roller having a low coefficient of friction surface (of less than 0.5 u ) and which is deformed when the roller 81 is pressed down on the stack so as to increase its area of contact with the set as described in detail in U.S. Pat. No. 4,826,383 to Millen. Such an eject system has been found particularly effective in ejecting unbound sets without disturbing their integrity. The eject rollers 80, 81 feed the stack or set into the nips of input rollers 84, 85 (FIG. 2) leading into the collection tray 69.

As shown in FIG. 2, wire buckle control fingers 86 are arranged to engage the top sheet of the stack adjacent to the two registration fingers 74. One of these is carried on the arm 82 and the other on a bracket 87.

Referring now to FIGS. 2 to 9, the corner registration apparatus 79 of this invention comprises a rotatably mounted registration device or wiper device 100 having four resilient blades 101 arranged to wipe against the sheets being registered over a limited arc of rotation defined by a swash plate 102. The wiper has a hub 104 which is mounted for rotation about an axis 103 normal to the stack support surface. It is driven by a motor 115 through a flexible drive 117 mounted on a bracket 116 (see FIG. 3) at the side of the tray 71. The blades 101, which are made of a resilient elastomeric material, are attached in the hub 104 by a circular backing plate 107 integral with the hub. They lie in radial planes passing through the axis 103 and depend from the backing plate 107, in the direction of the axis 103, towards sheet-engaging tips 106. The wiper 100 is arranged over the stack support surface 72 so that the blades are in interference with the support surface and wipe against it. The swash plate 102 is arranged between the wiper 100 and the stack support surface 72, being spaced above and parallel to the latter, so that the blades 101 are held out of contact with the support surface by the swash plate except over limited arc of rotation defined by an arcuate opening 114 in the swash plate. The arcuate extent and position of this opening are chosen so that as the wiper 100 rotates the blades urge the sheets into corner registration.

As shown in FIGS. 6 to 9, the wiper 100 has the tips 106 of the blades 101 lying in a common plane normal to said axis 103. As noted above the blades 101 are attached to the hub 104 by the circular backing plate 107. As best seen in FIG. 7 the blades 101 are mounted in radial slots 108 in the backing plate and to this end have T-mounting flanges 109. The blades 101 are held in position in the slots 108 by a clip-on cover 110.

The outer edges of the blades are parallel to the axis 103 but the inner edges are angled outwardly from the axis in the direction towards the tips 106 giving the blades a tapered form. The blades are rooted between pairs of support flanges 111 of the backing plate and as best seen in FIG. 8 these flanges are angled so as to give the blades an effective outward tilt relative to the axis 103.

The hub is provided with a mounting hole 112 which is noncircular for mounting it on the drive shaft of flexible drive 117.

The wiper 100 is arranged over the support surface so that the blades make interference contact with the support surface and the swash plate 102 is arranged above the surface 72 sufficiently to accommodate a stack of the desired height.

The blades 101 of wiper 100 pass into engagement with the sheets being stacked over a limited arc of rotation defined by the opening 114, which urges the sheet in the direction towards the registration corner.

Figure 4:
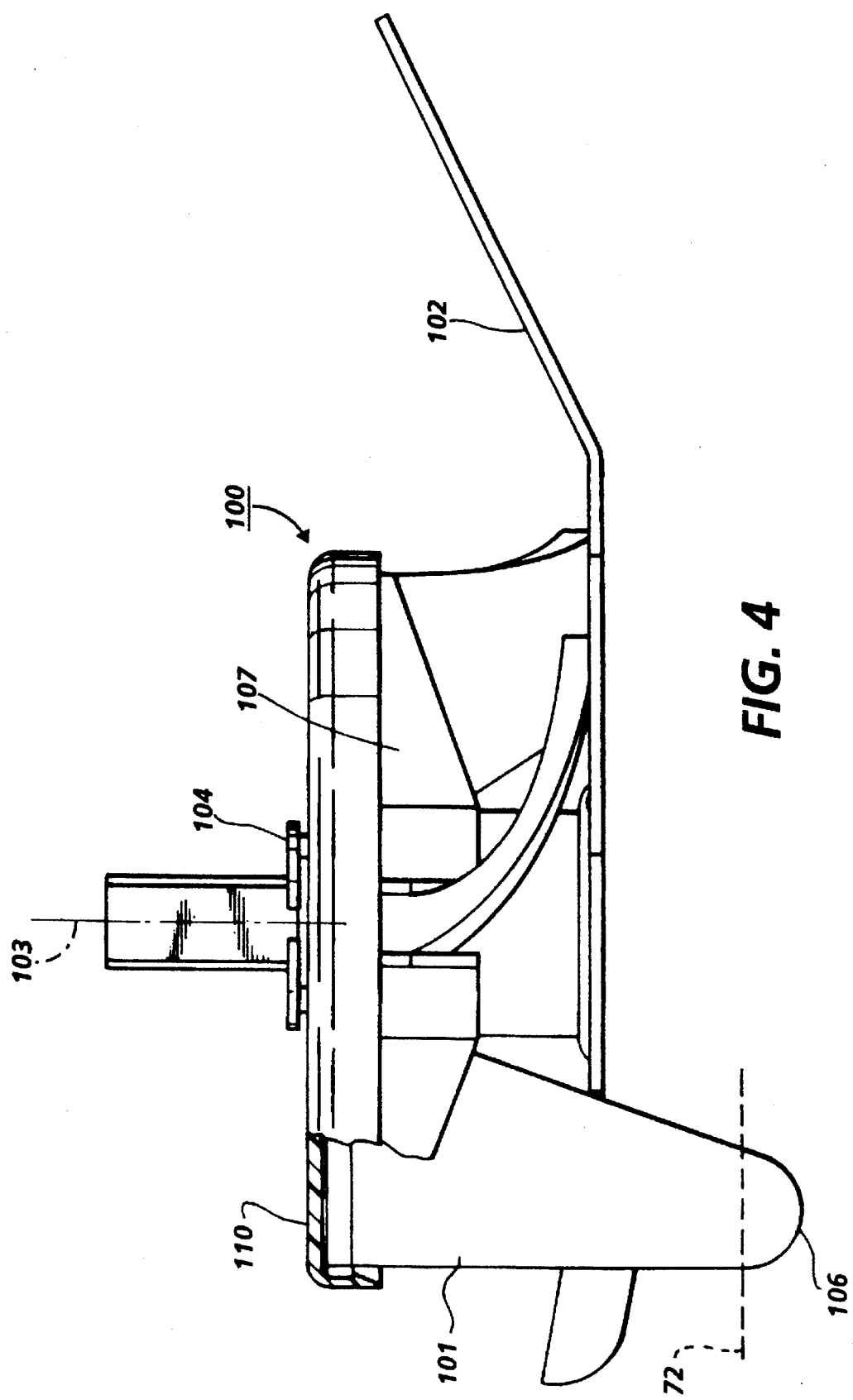
FIG. 4 is an enlarged side elevation of the sheet registration apparatus.
Figure 5:
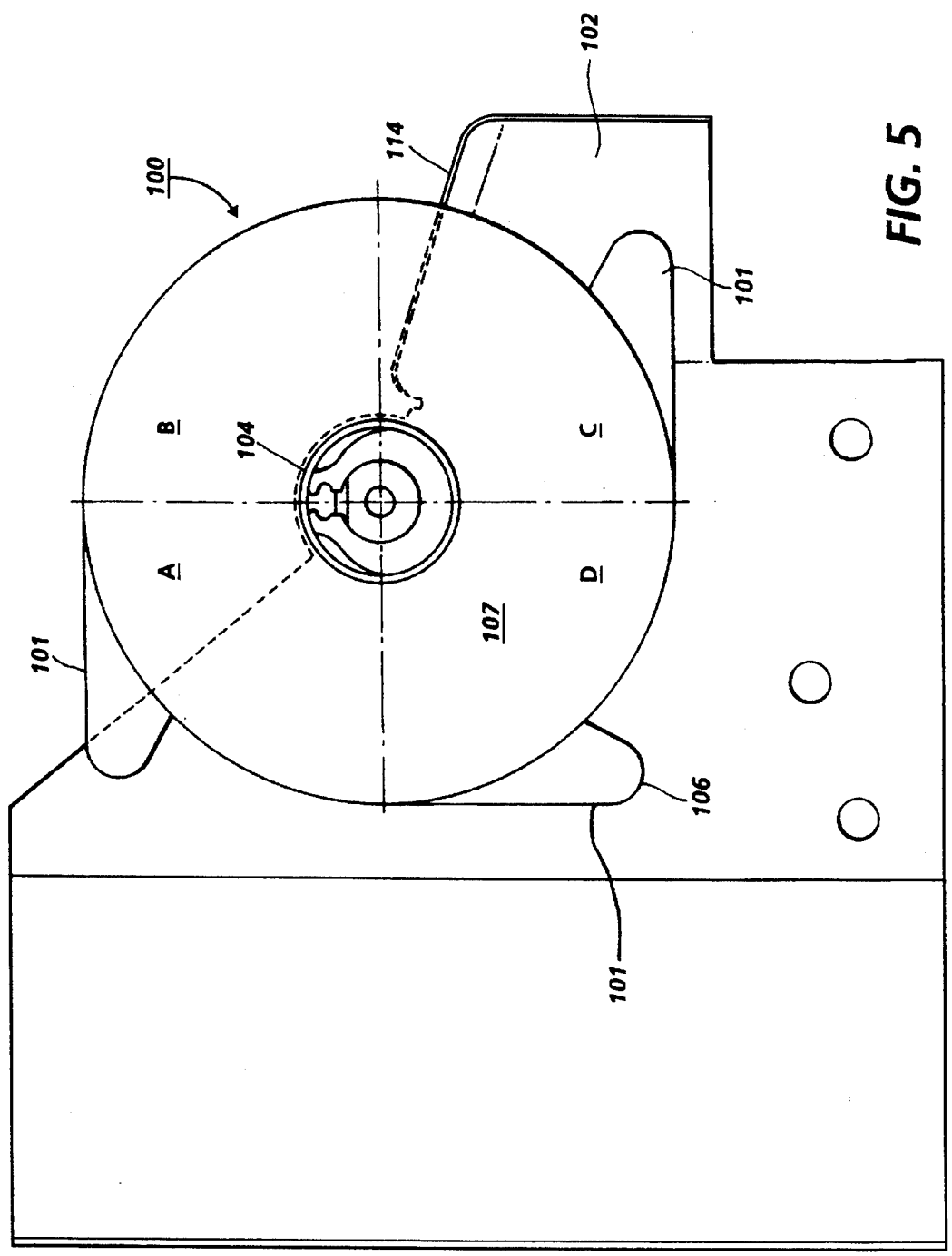
FIG. 5 is an enlarged plan view of the sheet registration apparatus.
Figure 5C:
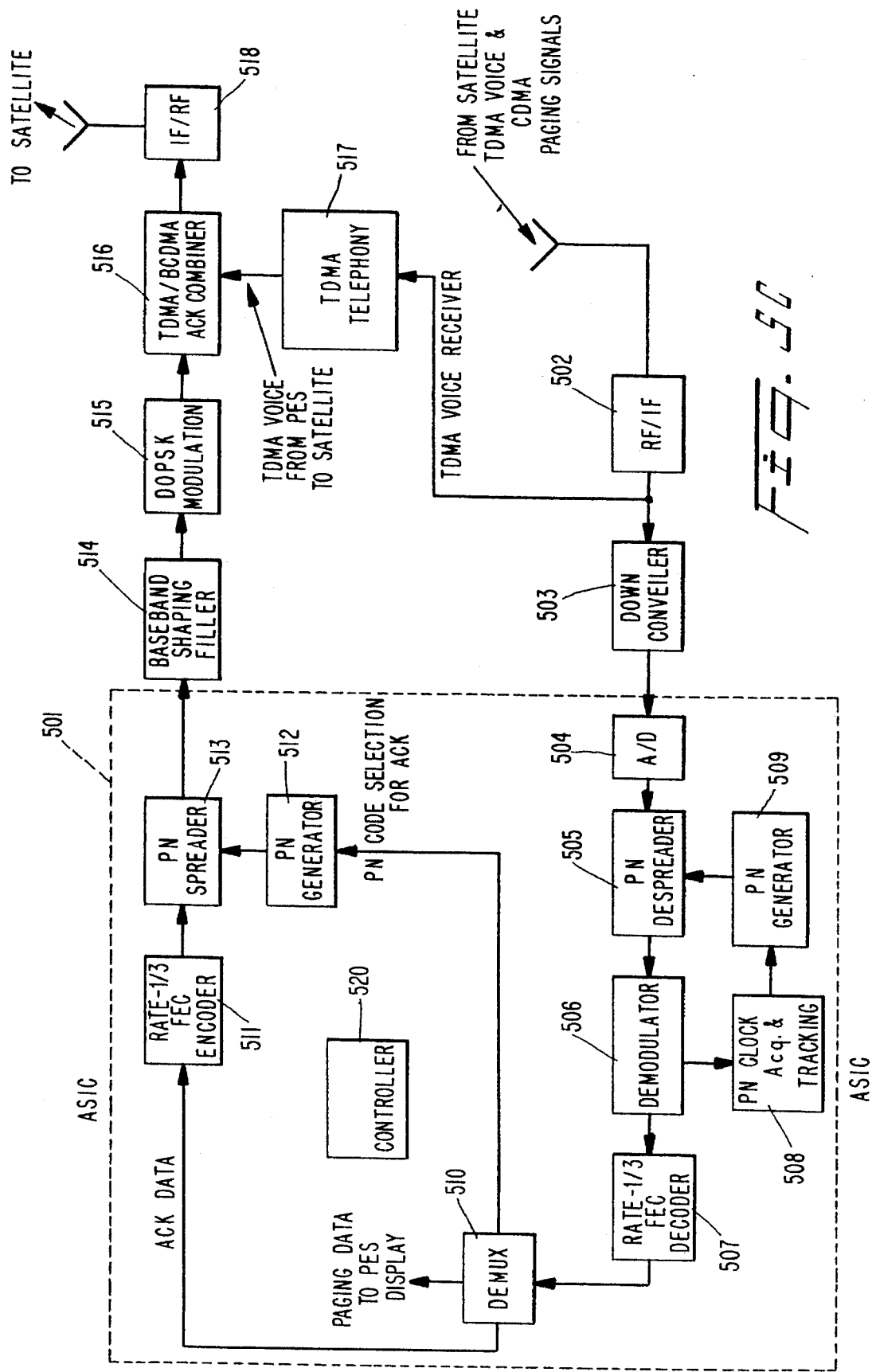

The blades 101 of the wiper 100 are prevented by the swash plate 102 from contacting the sheet being registered except when they are over the opening 114. During the remainder of each revolution the blades are bent out of sheet contact as shown in FIGS. 4 and 5 against the upper surface of the swash plate. It will thus be realized that as the wiper 100 rotates, the blades 101 enter the opening 114 in turn and due to their resilience unbend so as to engage a sheet therebeneath. Following a limited arc of rotation in contact with the sheet they are then disengaged from the sheet by again being bent upwards as they reach the end of the opening.

In the embodiment illustrated the registration device is rotated clockwise as seen from above.

The arcuate extent and angular position of the opening 114 in the swash plate 102 will depend on a number of factors. For a proper understanding of this it should be realized that as the blades are released by the swash plate for engagement with the sheet as they enter the opening, there is a finite delay before the tip of the blade contacts the sheet and during this time the device will have rotated through a finite distance. The arc of contact of each blade with a sheet beneath the swash plate will thus be less than that of the opening. The size and position of the opening 114 will depend on the number of blades 101 of the registration device, the speed of rotation of the registration device and the height of the swash plate 102 above the support surface 72. The speed of rotation of the wiper device 100 will itself depend on the velocity of the sheets being delivered beneath it. Generally it is preferred that only one blade of the device is in contact with the sheet being registered at one time. However, in the case of a stacker it will be realized that as the stack builds up, the blades will take less time to come into engagement with the sheets and depending particularly on the speed of rotation of the device and the capacity of the stacker it may be that a swash plate opening chosen to given a sufficient arc of contact with the bottom or first delivered sheet in the stack will result in the top sheets of a relatively thick stack being contacted momentarily by two blades. Generally the contact of the blades with the sheet should preferably not be greater than a 90° arc extending between the direction of sheet travel and the direction normally towards the side registration edge. However, by mounting the blades as in the embodiment illustrated so that they will be bent generally tangentially to the backing plate the arc may be extended slightly without the blade tips moving from the registration edge in opposition to sheet travel.

Figure 10A:
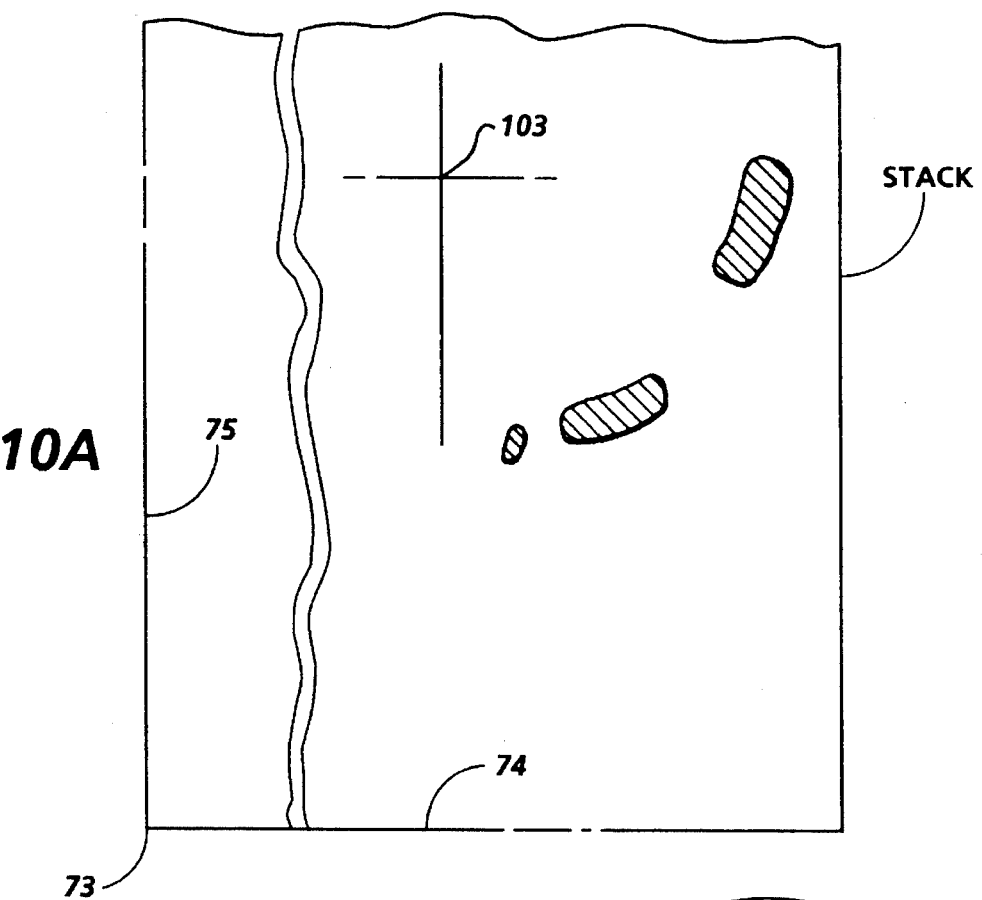
Figure 10B:
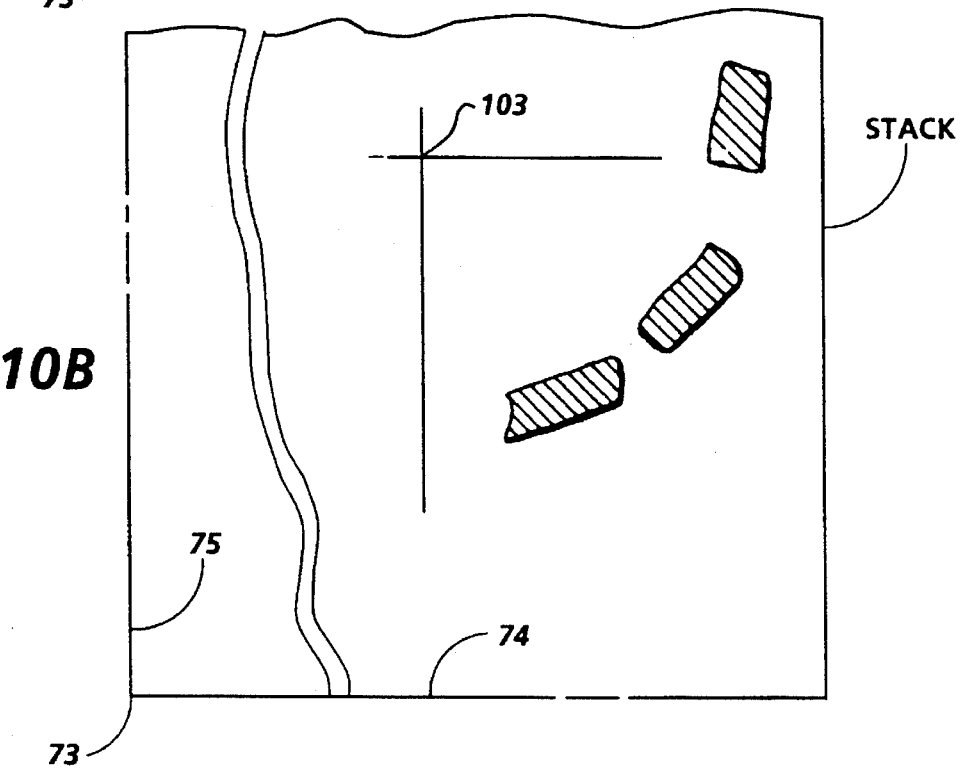
Figure 10C:
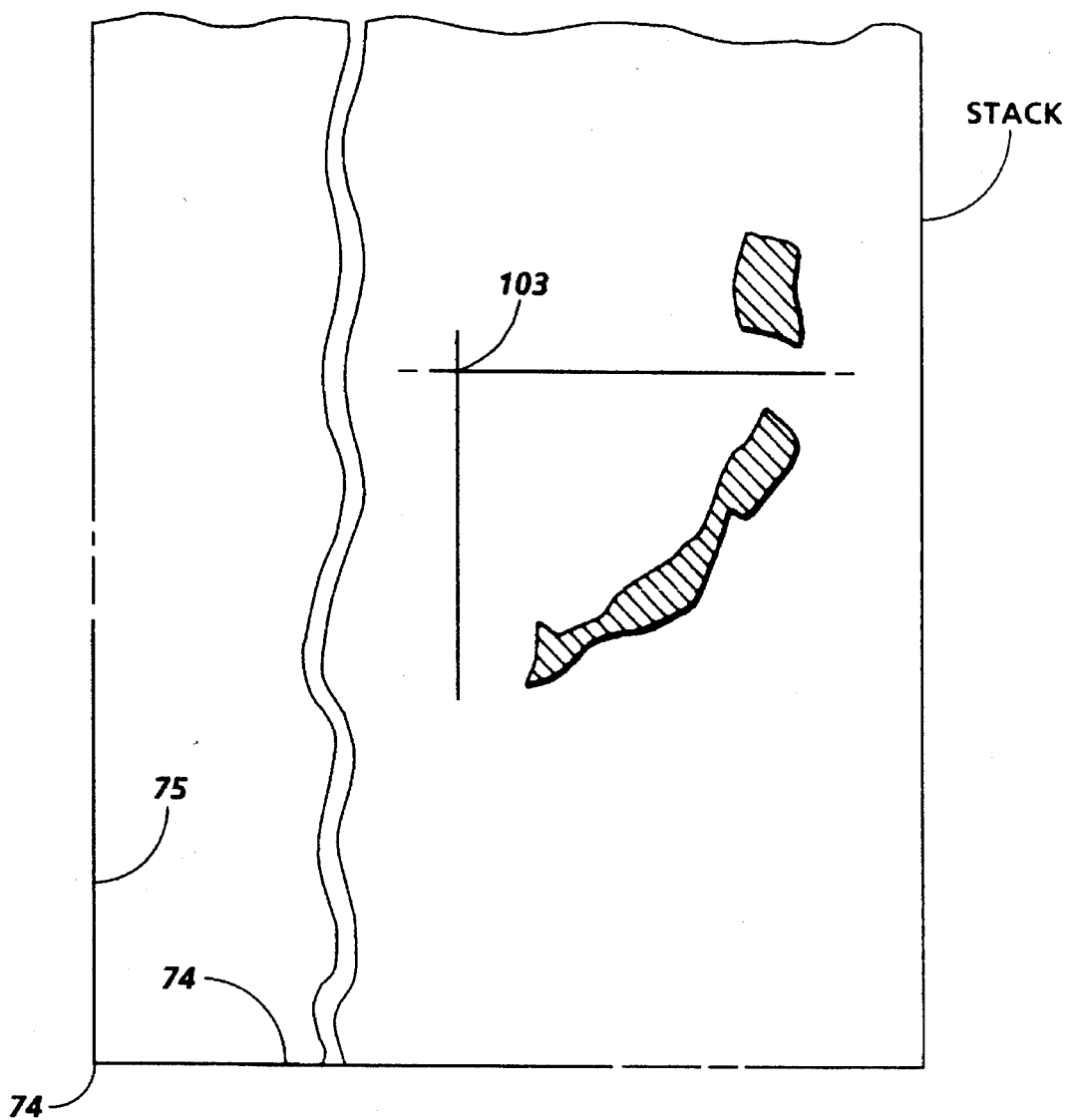
Figure 11:
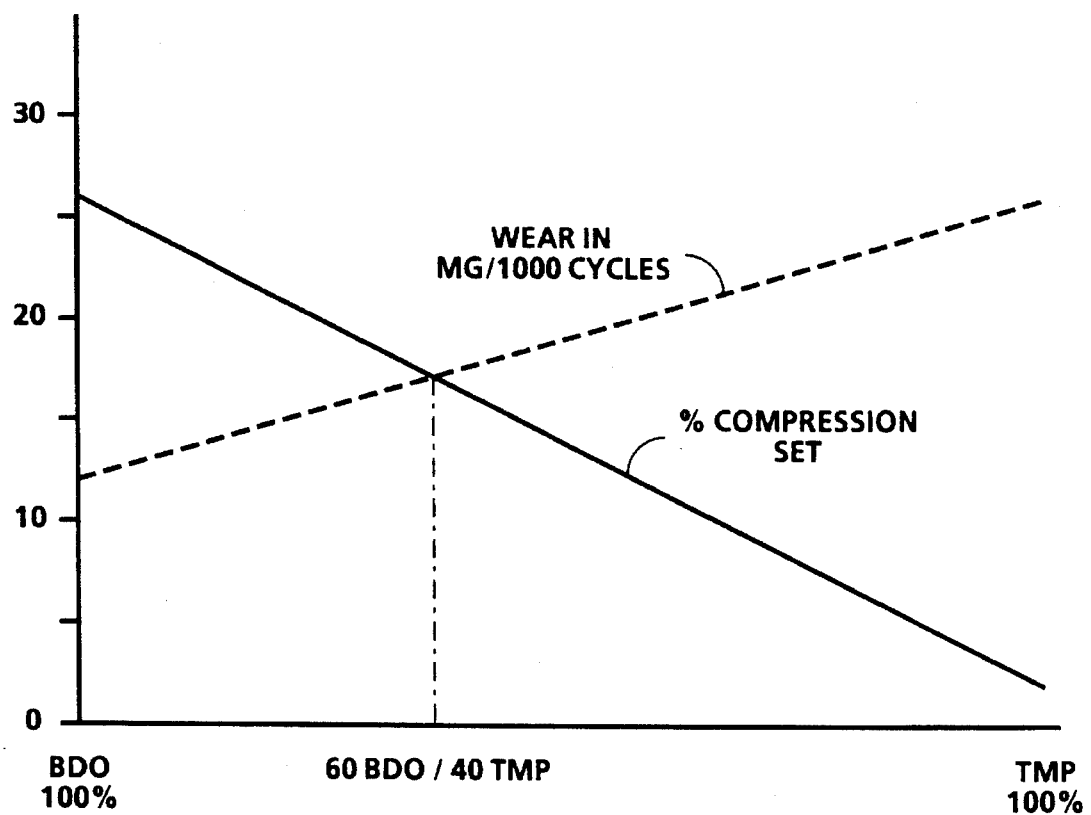
FIG. 11 is a graphical representation illustrating the optimization in compression set characteristics and wearing characteristics based on the selection and amount of crosslinking composition.

Three typical footprints of a blade with sheets at different heights above the support surface are shown in FIGS. 10A to 10C in which FIG. 10A shows the footprint for a minimum stack height, FIG. 10C shows the footprint for a maximum stack height and FIG. 10B shows the footprint for an intermediate stack height. It should be noted that contact with the sheet is not continuous but rather increases in extent with increase in set height. This is not surprising since the vertical travel of the blade tip and thus its tendency to bounce is less the higher is the stack. It will also be seen that the higher the stack the earlier the blade both contacts and disengages from the sheet.

It would perhaps be expected that since reverse wiping of the blades, i.e. in opposition to the direction of sheet travel, should be avoided, the exit end of the swash plate opening 114 should be parallel to the side registration edge. However, because there is an interference between the blade tip 106 and the stack support surface 72 (which interference increases as a stack is built up), the exit end of the swash plate opening 114 may be positioned slightly beyond the radius of the registration device which is parallel to the side registration edge so that the blade does complete a 90° arc of wiping movement with the tip travelling normally to the registration edge at the time it is lifted off the surface of the sheet.

Depending upon the sheet velocity, stack height requirements (which determine the height of the swash plate above the support surface) and the dimensions of the registration device, the swash plate opening 114 may vary from less than 90° up to 150° or more. In order to avoid the blade tip 106 passing the radius of the device 100 parallel to the side registration edge, the angle between that radius and the end of the opening 114 will not be more than a few degrees and will be proportional to the minimum interference of the blade tips with the stack support surface. Desirably, the angle will be such that for a single sheet on the stack support surface the blade tip is disengaged from the sheet at the moment when it is travelling normally to the side registration edge. Given that as the stack height increases, so does the interference of the blade with the stack the time at which the blade will be disengaged is advanced. For side registration it is desirable that the blade wipe nearly as possible up to the direction normal to the registration edges so the angle of the exit of the opening 114 is chosen to give this condition for a single sheet.

The angular position of the entry edge of the opening 114 will depend upon the degree of forward motion to be imparted to the sheet, the velocity of the sheet itself and, importantly, the speed of rotation of the registration device. The limit position is that in which the blade when it first contacts the sheet is travelling parallel to the registration edge. This will depend upon the height of the swash plate, the manner in which the blade bends when it contacts the sheet and the amount of interference between the blade and the swash plate, as well as the distance of the stack below the swash plate. Further, the more resilient the blade material the quicker it will engage the sheet when it is released from the swash plate.

As has been mentioned it is preferable to avoid contact with the sheet by two blades simultaneously. Thus the size of the opening will also depend upon the number and angular spacing of the blades. It has been found that for a device having five blades an opening of slightly more than 90° is suitable whereas for a device having four blades an angle of 146° has been found satisfactory.

In a specific embodiment the device has four blades equally spaced therearound and mounted in a rigid plastic backing plate 107 so as to depend from the plate at an effective outwardly projecting angle relative to the axis 103 of 20°. The blades are 39 mm long measured from their effective roots (where they project out of the backing plate) to their tips 106. The blade tips 106 are 32 mm from the axis 103 and the blades are 3 mm thick and 24 mm wide at their roots. The swash plate top surface is 15.6 mm above the stack support surface and the blade has an interference of 5 mm with the support surface (and thus 20.6 mm with the top of the swash plate). The arcuate opening 114 in the swash plate is 146° with the entry edge of the opening positioned at an angle of 39° ahead of that radius of the device which is normal to the side registration edge. Such apparatus would be suitable for up to about 12 to 13 mm stacks of flat paper but where, as in practice, sheets exiting a photocopier exhibit some degree of curl, the swash plate height designated is intended for stacks up to about 7.5 mm.

In order to keep friction to a minimum the top surface of the swash plate 102 is coated with a low-friction material such as a fluorocarbon (PTFE) resin.

The speed of rotation of the wiper device 100 is designed to be such that the tips of the blades 101 should have a velocity greater than the forward motion of the sheets being registered. Further, it must be fast enough to register a sheet before the arrival beneath the swash plate of the next sheet and desirably fast enough to register the last sheet in time to permit binding (stitching) in the intersheet gap period. Thus for sheets travelling at an input speed of 973 mm per sec., a blade tip speed of greater than 1800 mm per sec. has been found desirable. For this speed a four bladed registration device will rotate at 478 rpm giving a frequency of blade to sheet contact of 40 per sec.

The friction between the blades 101 and the sheet being registered needs to be greater than the intersheet friction. The intercopy or intersheet friction is generally of the order 0.15 to 0.65 u and the blade/sheet friction is desirably between 0.8 and 2.0 u, preferably 1.4 u.

The registration apparatus 79 is desirably positioned as close as possible to the registration edges. In practice the position is limited by the stitcher head or other binding device and in the embodiment shown the axis of the registration device is 45 mm from the side registration edge 75 and 85 mm from the front registration edge 74.

In order to prevent wander of the bottom sheet in a stack, friction pads 119 comprising bristles pointing towards the side registration edge 75 are provided on the stack support surface.

According to the present invention a novel sheet registration apparatus and wiper device having a plurality of resilient blades is provided which has improved mechanical properties and in particular has improved high wear resistance and low compression set and does not put black marks on paper. This is achieved by carefully selecting a new polyurethane elastomer and the reactive constituents used to fabricate the elastomer and particularly the type and amount of crosslinking agents used.

Polyurethane elastomers are typically produced by the reaction of a polyisocyanate and a polyether containing hydroxyl groups according to the general reaction:

$$R_aNCO + R_bOH \rightarrow R_aNHCOOR_b$$

In the practice of the present invention the polyurethane elastomer is made by the reaction of a polytetramethylene ether glycol forming the base polymer chain which has the formula $HO[(CH_2)_4O]_nH$ wherein n is from about 8 to about 41 providing a molecular weight range of the order of from 650 to 2,900. In a preferred embodiment, wherein the overall mechanical properties including resiliency, hardness, compression set as well as toughness are relatively stable over a range of temperature and relative humidity distributions normally encountered in an office environment, n is between 39 to 41. Within this higher range of molecular weights of the glycol a relatively soft segment is provided in the polyurethane elastomer enabling a high level of resiliency over a relatively broad temperature range. The preferred polytetramethylene ether glycols are those having molecular weights near the higher end of the stated range and in particular the polyether glycol Terathane™ 2900 available from E. I. Du Pont de Nemours, Inc. which has a molecular weight of about 2900.

The diisocyanate is selected from the group consisting of diphenylmethane diisocyanates, toluene diisocyanates, naphthalene diisocyanates and blends thereof and is used in amounts of from about 20 to about 95 parts by weight per 100 parts by weight of the glycol. The functional NCO groups of the diisocyanate provide a relatively hard and rigid segment in the final polymer chain and act very much like a filler to provide a tough but flexible structure that has both hard and soft domains. Typical diisocyanates useful in the practice of the present invention include 4,4' diphenylmethane diisocyanate, 2,4' diphenylmethane diisocyanate, 2,2' diphenylmethane diisocyanate, 2,4-toluene diisocyanate, 2,6-toluene diisocyanate and naphthalene 1,5-diisocyanate as well as blends and mixtures thereof. A particularly preferred blend of diisocyanates is one containing 98 percent 4,4 diphenylmethane diisocyanate and 2 percent 2,4' diphenylmethane diisocyanate available under the designation Isocyanate™ 125M from Dow Chemical Company, Midland, Mich.

In a preferred embodiment, with the preferred higher molecular weight glycols, the diisocyanate or blend thereof is present in an amount of from about 22 to 26 parts by weight per 100 parts by weight of the glycol to provide the stoichiometric amount for the reaction to go to completion.

The optimization of the mechanical properties, and in particular, the achievement of high wear resistance with low compression set is attained according to the practice of the present invention by the selection of the polyurethane elastomer and in particular by the selection of the type and amount of crosslinking agents. Both bifunctional and trifunctional crosslinking agents are used in the practice of the present invention in a weight ratio of from about 60% to 40%, to 75% to 25% of bifunctional to trifunctional agents. The bifunctional agents have been found to provide a higher toughness, provide more chain extension in that they tend to linearly link the chain thereby providing a long, generally flexible glycol chain interrupted by the rigid Isocyanate units. The trifunctional crosslinkers tend to provide two ends of functionality as well as a 90 degree oriented functional member which crosslinks to other chains prohibiting the chains to slide by each other and thereby minimizing the compression set and tensile set properties. Accordingly, the appropriate bounds between hard and soft sites in the polyurethane elastomer is obtained by selecting the bifunctional and trifunctional crosslinking agents in the appropriate ratio. Typically, the bifunctional crosslinking agents take the formula HO(R$_1$)OH where R$_1$ is a straight or branched chain alkyl group having from 2 to 12 carbon atoms and the trifunctional crosslinking agent is taken from the formula: R'—C—[(OH)$_a$(CH$_2$OH)$_b$] where R' is H, CH$_3$ or C$_2$H$_5$, a is 0 or 1, b is 2 or 3 and a+b=3. Typical bifunctional diols include ethylene glycol, 1,4 butanediol, 1,3 butanediol 1,6 hexanediol and neopentyl glycol and typical trifunctional triols include trimethylolpropane, trimethylolethane and glycerol. Particularly, preferred bifunctional crosslinking agents include 1,4 butanediol, 1,6 hexanediol and 1,3 butanediol because they extend the polymer chain linearly yielding tough wear resistant materials and particularly preferred trifunctional crosslinking agents include trimethylolpropane and trimethylolethene because they cross link the polymer chains at 90° and yield very set resistant networks. The bifunctional butanediol acts as a chain extender to extend the chain in the linear way to provide linear soft sites thereby providing the greatest toughness in the final elastomer. On the other hand, the trifunctional trimethylolpropane provides the best compression set performance because it is trifunctional and provides crosslink exchange sites to tighten up the network, thereby providing a crosslinked, three-dimensional network. An amount of combined crosslinking agents is used to provide a satisfactorily cross linked elastomer. Typically, the total amount of combined crosslinking agents is from about 4 to about 18 parts per 100 parts of the polytetramethylene ether glycol depending on the molecular weight of the glycol with more cross linking agents being used with lower molecular weight glycols. In the preferred embodiment with glycols having high molecular weight of the order 2900 and smaller amounts of the diisocyanate of the order of about 22 to 26 parts by weight per 100 parts of the glycol only about 4 to 6 parts by weight of crosslinking agents is necessary because of the long glycol chain length with limited number of functional groups.

A catalyst is typically used to speed up the rate of reaction of the crosslinking and extending mechanisms to provide the cured urethane elastomers. Typical conventional catalysts performing this functioning include tin derivatives such as dibutyltindilaurate and stannous octoate; mercury derivatives such as phenylmercuric acetate and tertiary amines such as Polycat 33, Polycat 41, Polycat 70 and Polycat 77 which are used in conventional amounts, typically, a few drops in a dilute solution (2%) of the diol.

The polyurethane elastomer, according to the present invention, may be made according to any suitable procedure. For example, all the reactive ingredients including the catalyst may be added at one time or serially to a single reactor vessel to produce the polyurethane elastomer. However, this procedure results in a not very well controlled reaction in that there are two reactions taking place simultaneously; one between the glycol and the diisocyanate and the other between the reaction product of the first reaction and the mixture of crosslinking agents. Thus, formation of a prepolymer, chain extension and cross linking all occur at the same time. Accordingly, it is preferred to prepare a prepolymer of at least a portion of the glycol with at least a portion of the diisocyanate to enable the reaction of the NCO groups of the isocyanate with the OH groups of the glycol to form a long chain so that the NCO groups can't subsequently take up water and retain it in the final polyurethane elastomer presenting an ultimate problem in that it results in unpredictable properties dependent on relative humidity. The prepolymer method provides an initial low molecular weight polymeric diisocyanate and provides better contact over the polyurethane formation reaction and eliminates the formation of monomeric diisocyanate. Once the prepolymer, which is typically a viscous liquid, has been formed the mixture of crosslinking agents may be added together with the catalyst to form the polyurethane elastomer. Alternatively, the reaction may be suspended after it's initiated by freezing the reactants at a temperature of the order at 40° below zero Fahrenheit and the reaction completed at a later date by placing the frozen reactants, for example in an appropriately heated tool to make a part. Once all the reactants have been added together and the polymerization reaction has been initiated the forming polyurethane may be shaped according to any of the conventional techniques including injection molding, spin casting, flow coating, etc.

Examples

Polyurethane elastomer test samples were prepared in a one shot process from the following formula: 100 parts by weight of a polytetramethylene ether glycol, Du Pont Terathane™ 2900, 24 parts by weight of a mixture of 98 percent 4,4' diphenylmethane diisocyanate and 2 percent 2,4' diphenyl methane diisocyanate, Isocyanate™ 125M available from Dow Chemical Company, 3 parts by weight 1,4 butanediol available under the trademark DABCO DBO crosslinker from Air Products & Chemicals Inc., 2 parts by weight of trimethylolpropane available as RC Crosslinker TR from Wyrough and Loser, Inc., Trenton, N.J. and 1 to 5 drops of a catalyst mixture of 98 parts by weight of 1,4 butanediol and 2 parts by weight of dibutyltindilaurate.

All the ingredients were stored under nitrogen to prevent attack by atmospheric oxygen. Furthermore, each of the ingredients was stored in a jar with a molecular sieve at the bottom to absorb water and the jars placed in an oven to maintain the ingredients in a processable liquid form. The diisocyanate was stored at 40° C., the glycol, trimethylolpropane and catalyst mixture were stored at 70°–80° C. and the butanediol was stored at room temperature. Prior to mixing, the glycol, which was in a beaker was degassed in a vacuum chamber for 20–30 minutes at 80° C. and the diisocyanate, also in a beaker, was degassed for 15 to 20 minutes at 80° C. The butanediol, trimethylolpropane and catalyst mixture were added to a third beaker and degassed for 20 to 30 minutes at 80° C. The butanediol, trimethylolpropane and catalyst mixture were then added to the glycol followed by the addition of the diisocyanate and hand mixed until clear, but for no longer than 30 seconds, after which the mixture was degassed in a vacuum chamber for 1 to 2 minutes to achieve approximately 1 millimeter of mercury vacuum and then poured into a mold and oven cured at 230° F. for 2 hours. The test samples were removed from the mold and postcured in an oven at 230° F. for 16 hours. The test samples were removed from the oven and preconditioned at room temperature for 10–16 days to achieve stability before evaluation.

Additional samples were made according to the above procedure except that the ratio of the two identified cross linking agents was varied as indicated in the following table. The samples were evaluated for wear and compression set with the following results:

| BDO/TMP ratio | Wear mg. | Compression Set |
| --- | --- | --- |
| 100/0 | 12 mg. | 26% |

-continued

| BDO/TMP ratio | Wear mg. | Compression Set |
|---|---|---|
| 60/40 | 17 mg. | 17% |
| 50/50 | 20 mg. | 12% |
| 0/100 | 27–30 mg. | 2% |

Wear was measured in weight loss in milligrams per 1000 cycles according to the Taber Abrasion Wear Test under ASTM D4060 and compression set, or percent permanent thickness change when a sample is compressed a stated amount under certain conditions and the compression force removed, was measured using ASTM D395, Method B. The overall results comparing compression set and wear with respect to the different ratios of the crosslinking agents are graphically illustrated in FIG. 3. Therein, it may be observed that the optimum balance in compression set and wear is achieved at about the 60 to 40 weight ratio of bifunctional cross linking agent to trifunctional cross linking agent.

Using a manufacturing process with a prepolymer is preferred to control heat buildup, which changes reaction rate and crosslinking uncontrollably, during fabrication by the exothermic reaction between the base glycol polymer and the diisocyanate. This permits the initial addition of only a portion of the glycol to form a prepolymer and control the heat with the subsequent addition of a final portion of the glycol to form the elastomer. We have found that when using this technique of first forming a prepolymer it is desirable to change the weight ratio of bifunctional cross linker to trifunctional cross linker from 60 to 40 to 75 to 25 to maintain the optimum balance between compression set and wear.

A prepolymer of the Terathane™ 2900 and the Isocyanate™ 125M was prepared as follows: 1000 parts by weight of the glycol which had previously been heated under vacuum at 90° C. for 2 hours to remove any moisture present and then cooled to 70° C. under nitrogen was added to 351 parts by weight of the diisocyanate. The heat of reaction will increase the temperature of the mixture to 84° C.+4'–' C. at which it will be held for 1 to 2 hours to ensure complete reaction. A polyurethane elastomer was prepared from the following formula: 100 parts by weight of the above prepared prepolymer, 34.4 parts of the glycol, 3.4 parts of the 1,4 butanediol, 2.3 parts of the trimethylolpropane and 5 to 8 drops of the same catalyst mixture used in the one shot process. The prepolymer is stored at 80° C. and the remaining ingredients are stored as in the one shot process. The butanediol, trimethylolpropane and catalyst mixture were mixed as in the one shot process and prior to mixing all the ingredients were degassed as in the one shot process. The prepolymer was degassed in a vacuum chamber for 20 to 30 minutes at 80° C. The glycol, the mixture of the butanediol, trimethylolpropane and catalyst mixture were added to the prepolymer and hand mixed for about 30 seconds followed by degassing in a vacuum chamber for 1.5 to 2 minutes. Thereafter, the mixture was molded, cured, postcured and preconditioned as in the one shot process.

Additional evaluation in an environmental chamber shows the stability of the polyurethane elastomer according to the present invention with regard to changes in temperature and relative humidity. The samples evaluated were made according to the one shot procedure. Evaluation over the range of temperatures from 65° F. to 85° F. and relative humidity of 15% to 65%, conditions which are inclusive of most normal office environments provided the following results.

| Conditions | Hardness Shore A | Resiliency |
|---|---|---|
| 65° F., 15% RH | 68 | 74 |
| 85° F., 65% RH | 74 | 76 |

Resiliency, the percent rebound, was measured according to ASTM D2632 and varies less than 5% and hardness varies less than 10%, it being noted that it is desirable to provide a hardness as close to 70 or slightly close as possible. The stability of resiliency is a dynamic property critical to successful functioning.

Accordingly, the present invention provides a novel sheet registration apparatus and in particular a wiper device having a plurality of resilient blades having high wear resistance and a low compression set and mechanical properties which remain relatively stable over a broad range of temperatures and relative humidities. In addition, the blades do not put black marks on the paper sheets.

The patents referred to herein are hereby specifically, totally and completely incorporated herein by reference.

While the present invention has been described with reference to specific embodiments described herein it will be apparent that many alternatives, modifications and variations may be made by those skilled in the art. Accordingly, it is intended to embrace all such alternatives and modifications as may fall within the spirit and scope of the appended claims.

We claim:

1. A sheet registration device including a hub having an axis of rotation and a plurality of resilient plastic blades arranged in radial planes passing through said axis and extending in the direction of said axis beyond one end of the hub towards sheet-engaging tips lying in a common plane normal to said axis said blade being made of a polyurethane elastomer obtained by the reaction of a polytetramethylene ether glycol having the formula $HO[(CH_2)_4O]_nH$ where n is from 8 to 41, and from about 20 to about 95 parts by weight per 100 parts by weight of said glycol of a diisocyanate selected from the group consisting of diphenylmethane diisocyanates, toluene diisocyanates, naphthalene diisocyanates and blends thereof and a sufficient amount of linking agents to provide a crosslinked elastomer, said linking agents comprising a mixture of from about 75 to 60% by weight of a diol having the formula $HO(R_1)$ OH where $R_1$ is a straight or branched chain alkyl group having from 2 to 12 carbon atoms and from about 25 to 40% by weight of a triol having the formula: $R'—C—[(OH)_a(CH_2OH)_b]$ where R' is H, $CH_3$ or $C_2H_5$, a is 0 or 1, b is 2 or 3 and a+b=3.

2. The sheet registration device of claim 1 wherein the elastomer is prepared by adding all the recited reactive constituents and linking agents to a reaction vessel at the same time.

3. The sheet registration device of claim 2 wherein the total weight of linking agents is from about 4 to about 18 parts by weight per 100 parts of polytetramethylene ether glycol.

4. The sheet registration device of claim 2 wherein the elastomer is formed from a mixture of linking agents of from about 60% by weight 1,4 butanediol and 40% by weight trimethylolpropane.

5. The sheet registration device of claim 2 wherein n is from 39 to 41, the linking agents are a mixture of from about 60% by weight 1,4 butanediol and 40% by weight dimethylolpropane and said diisocyanate is a blend of 4,4' diphenylmethane diisocyanate and 2,4' diphenylmethane diisocyanate.

6. The sheet registration device of claim 1 wherein the elastomer is prepared by first forming a prepolymer of the polytetramethylene ether glycol and the diisocyanate followed by the addition of both linking agents to the prepolymer.

7. The sheet registration device of claim 6 wherein the total weight of linking agents is from about 4 to about 18 parts by weight parts per 100 parts of polytetramethylene ether glycol.

8. The sheet registration device claim 6 wherein the elastomer is formed from a mixture of linking agents of about 75% by weight of 1,4 butanediol and 25% by weight trimethylolpropane.

9. The sheet registration apparatus of claim 6 wherein n is from 39 to 41, the linking agents are a mixture of from about 75% by weight 1,4 butanediol and 25% by weight trimethylolpropane and said diisocyanate is a blend of 4,4' diphenylmethane diisocyanate and 2,4' diphenylmethane diisocyanate.

10. The sheet registration device of claim 1 wherein the total weight of linking agents is from about 4 to about 18 per 100 parts by weight of polytetramethylene glycol.

11. The sheet registration device of claim 1 wherein the elastomer is formed from a mixture of linking agents of about 75% by weight of 1,4 butanediol and 25% by weight trimethylolpropane.

12. The sheet registration device of claim 1 wherein the elastomer is formed from a mixture of cross linking agents of from about 60% by weight 1,4 butanediol and 40% by weight trimethylolpropane.

13. The sheet registration device of claim 1 wherein n is from 39 to 41.

14. The sheet registration device of claim 13 wherein said diisocyanate is present in an amount from about 22 to 26 parts by weight per 100 parts by weight of said glycol.

15. The sheet registration device of claim 14 wherein the total weight of linking agents is from about 4 to about 6 parts by weight per 100 parts by weight of polytetramethylene glycol.

16. The sheet registration device of claim 1 wherein said diisocyanate is present in an amount from about 22 to 26 parts by weight per 100 parts by weight of said glycol.

17. The sheet registration apparatus of claim 1 wherein said diisocyanate is selected from the group consists of diphenylmethane diisocyanates.

18. The sheet registration apparatus of claim 17 wherein said diisocyanate is a blend of 4,4', - diphenylmethane diisocyanate and 2,4'-diphenylmethane diisocyanate.

19. A sheet registration apparatus for registering a sheet on a surface against a registration stop, comprising a device having a plurality of resilient blades lying in radial planes passing through an axis arranged generally normal to the surface and about which said blades are rotatable with said blades extending in the direction of said axis towards said surface and terminating in sheet engaging tips arranged to wipe over a limited arc of rotation against a sheet on the surface to urge it towards said registration stop, said blades being made of a polyurethane elastomer obtained by the reaction of a polytetramethylene ether glycol having the formula: $HO[(CH_2)_4O]_nH$ where n is from 8–41, and from about 20 to about 95 parts by weight per 100 parts by weight of said glycol of a diisocyanate selected from the group consisting of diphenylmethane diisocyanates, toluene diisocyanates, naphthalene diisocyanates and blends thereof and a sufficient amount of linking agents to provide a crosslinked elastomer, said linking agents comprising a mixture of from about 75 to 60% by weight of a diol having the formula $HO(R_1)OH$ where $R_1$ is a straight or branched chain alkyl group having from 2 to 12 carbon atoms and from about 25 to 40% by weight of a triol having the formula: $R'—C—[(OH)_a(CH_2OH)_b]$ where R' is H, $CH_3$ or $C_2H_5$, a is 0 or 1, b is 2 or 3 and a+b=3.

20. The sheet registration apparatus of claim 19 wherein n is from 39 to 41, the linking agents are a mixture of from about 60% by weight 1,4 butanediol and 40% by weight dimethylolpropane and said diisocyanate is a blend of 4,4'diphenylmethane diisocyanate and 2,4' diphenylmethane diisocyanate.

\* \* \* \* \*